United States Patent [19]
Johnson

[11] 3,769,124
[45] Oct. 30, 1973

[54] METHOD AND APPARATUS FOR SPLICING FOAM SHEET MATERIAL

[75] Inventor: David Emil Johnson, Macedon, N.Y.

[73] Assignee: Mobil Oil Corporation, New York, N.Y.

[22] Filed: Mar. 21, 1972

[21] Appl. No.: 236,766

[52] U.S. Cl.............. 156/159, 156/304, 156/504, 156/517, 156/544
[51] Int. Cl........................... B31f 5/00, B65h 19/08
[58] Field of Search................ 156/159, 304, 258, 156/306, 502, 504, 507, 517, 544, 583

[56] References Cited
UNITED STATES PATENTS
3,227,594  1/1966  Ryan.................................. 156/159
3,673,046  6/1972  Pepmeier et al..................... 156/517

Primary Examiner—William A. Powell
Attorney—Andrew L. Gaboriault et al.

[57] ABSTRACT

A method and apparatus for automatically splicing foam sheet material, such as thermoplastic polystyrene foam, for example, utilizing a butt-welding technique. The apparatus comprises a moving hot wire which severs and simultaneously heat softens the leading edge of a new foam stock roll; and subsequently severs and heat softens the trailing end of a used roll, prior to bringing the heat softened ends of the rolls together, thereby forming a butt-weld.

3 Claims, 5 Drawing Figures

3,769,124

METHOD AND APPARATUS FOR SPLICING FOAM SHEET MATERIAL

BACKGROUND OF THE INVENTION

1. Field of the Invention

The present invention relates generally to a method and apparatus for forming continuous sheet material from individual rolls of material. In particular, the present invention relates to a method and apparatus for butt, i.e. edge toedge, welding of thermoplastic sheet stock material thereby forming a splice to insure continuity of the sheet material, and resultant continuity of manufacturing operations, as the sheet is passed into a subsequent work zone, such as a thermoforming apparatus, for example.

2. Description of the Prior Art

U.S. Pat. No. 3,586,584 discloses an apparatus adapted for butt-welding thermoplastic work members, such as plastic sheets. The method and apparatus employed in this patent relies on utilization of moving work tables which support the plastic sheet members which are to be butt-welded together. The apparatus described in the aforenoted patent butt-welds heavy thermoplastic sheet materials, it does not trim the ends of the sheet material prior to welding, nor does it utilize the welding technique nor the apparatus component members as described hereinafter.

SUMMARY OF THE INVENTION

As hereinbefore noted the present apparatus method relates to the butt-welding or splicing together of two ends of a thermoplastic sheet stock material which is being utilized in a continuous manufacturing operation. The apparatus employs, in combination, a moving hot wire together with sheet stock clamping means to effect the splice. The hot wire and clamping means operate in sequence. Initially, in preparation for the splice, the loose or leading end of a new roll of thermoplastic stock is threaded into the splicing apparatus. The tail, or end of the old thermoplastic roll supplies a signal which serves to actuate the splicing apparatus. When the apparatus is actuated, the hot wire, moving in a downward path, serves as a hot knife to cut, trim and heat the ends of both rolls. The heated ends of the rolls are than aligned with each other on a horizontal plane. Finally the splice is completed by bringing the preheated ends of the thermoplastic stock together thereby forming a butt-weld.

DESCRIPTION OF SPECIFIC EMBODIMENTS

Figure 1:
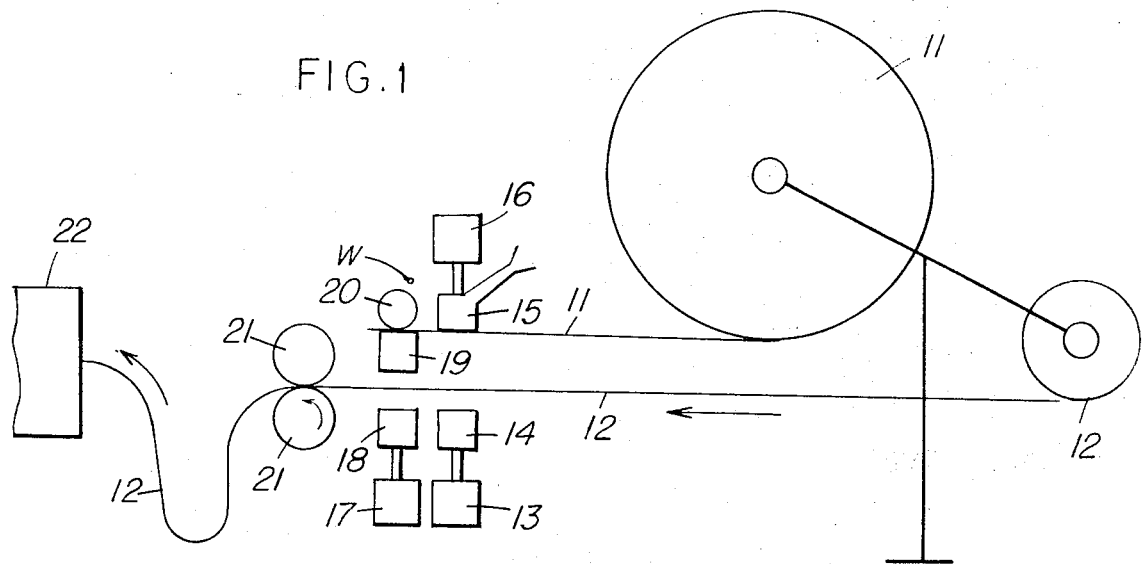
FIGS. 1, 2, 3, 4 and 5 are schematic fragmentary illustrations which are side elevational views taken on a vertical line through the center of the splicing apparatus of the present invention, at sequential positions of the apparatus throughout its operating cycle.

In accordance with one enbodiment of the present invention thermoplastic material such as thermoplastic foam, for example, polystyrene foam sheet stock, is employed in a thermoforming operation. Such an operation comprises feeding a relatively flat sheet of polystyrene foam into a thermoforming apparatus which includes a preheat oven in which the foam sheet stock is preheated to a thermoforming temperature and, after the requisite forming temperature has been reached, the sheet stock is thermoformed, utilizing for example, matches mold elements into a variety of products including produce trays, meat trays, egg cartons, cups and the like.

When polystyrene foam sheet stock is produced utilizing a "direct-injection" extrusion process, such as the process described in U.S. Pat. Nos. 3,444,283 and 3,482,006, it is necessary for the polystyrene foam sheet stock to be aged for a number of hours or even days prior to its employment in a thermoforming operation to insure that the polystyrene sheet stock, when passed through a thermoformer apparatus to produce a desired product, is in condition to be satisfactorily thermoformed. The primary reason for such aging is to allow air to infiltrate the foam cells. Accordingly, the extrusion of the polystyrene foam sheet for the subsequent thermoforming operations is usually not an "in-line" process, but rather individual rolls of the polystyrene foam are supplied to the thermoformer. In the past, when each individual roll being supplied to a thermoformer was exhausted, the lead end of a new roll of polystyrene foam sheet stock was either manually spliced, utilizing for example, an overlap welding technique, to the trailing end of the exhausted roll or, the leading edge of the new roll was manually fed into the thermoforming operation as the old roll supply became exhausted.

The splicing method and apparatus of the present invention now overcomes the obvious disadvantages to such manual overlap welding together of the sheet stock as well as the attendent disadvantages of manual feed-in operations of foam sheet into the thermoforming apparatus. In accordance with the present invention, as a roll of polystyrene foam sheet stock being fed into a thermoformer oven becomes exhausted, a new roll is positioned so that the leading edge thereof may be butt-welded, automatically, to the trailing edge of the old or expired roll. This is accomplished utilizing a heated wire which moves downwardly into contact with the pre-positioned leading edge of the new foam stock roll and severs a portion of the leading edge of the new roll. The severed portion of the new roll is discarded as scrap material. The heated wire continues its downward movement and comes into contact with and severs through the trailing portion of the old roll sheet stock. The wire remains down while the severed ends are aligned horizontally, after horizontal alignment the wire returns to its original position, heating the severed edges as it returns. The severed edges are subsequently brought together on the same horizontal plane and the heated edges thereof, the edges having been heated as a result of the passage therethrough of the hot wire, are brought to an abutting relationship while still in a heated condition. When the respective heated edges are brought into pressure contact, they become heat welded together thereby forming the splice. As soon as the splice has been formed the web is released so that it may proceed, in a noninterrupted fashion, into the thermoformer preheat oven. This operation is continually repeated so that the feed-in of stock material to the thermoformer is in a continuous, rather than interrupted, fashion.

For a better understanding of a specific embodiment of the butt-weld splicing method and apparatus in accord with the present invention reference is had to the drawings, and in particular FIGS. 1 through 5 inclusive. As shown in FIG. 1, polystyrene foam sheet stock 12, approximately 100 mils thick, is drawn from substantially exhausted supply roller 12' by counter rotating nip rollers 21 into a preheat section 22 of a thermoforming oven. As illustrated in FIG. 1, polystyrene foam sheet 11, supplied from a full polystyrene foam roll 11', is positioned in a horizontal plane above sheet 12. Polystyrene sheet 11 is held in position above sheet 12 utilizing clamping bar 19 and roller 20 which elements hold, by nipping engagement, the leading edge of new roll 11'.

Figure 2:
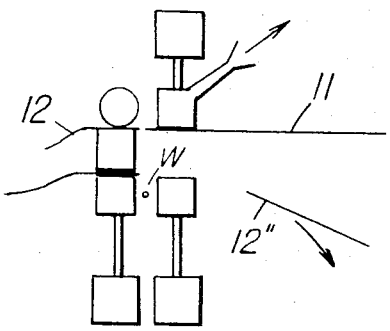

As roller 12' exhausts its supply of foam sheeting 12, the trailing edge of sheet 12 actuated the splicing mechanism of the present invention. The splicing mechanism operates sequentially as specifically shown in FIGS. 2, 3, 4 and 5. As illustrated in FIG. 2, heated wire W, approximately 0.065 inches in diameter, fabricated from nichrome and maintained within a temperature range of from about 850° up to about 1,300°F., which in FIG. 1 was positioned above the superposed layers 11 and 12, cycles downwardly in a slightly arcuate path thereby severing, triming and heating the leading edge of sheet 11 and subsequently the trailing edge of sheet 12. Sheet 12 as shown in FIG. 2 is clamped into position during the severance operation by means of clamping bar 18 nipping sheet 12 to clamping bar 19. It will be noted that clamping bar 18 which is mounted on pneumatically actuated cyclinder 17 is now as shown in FIG. 2, in its extended position. Also as shown in FIG. 2 vacuum clamping bar 15 holds the severed edge of foam web 11 in the same horizontal plane as illustrated in FIG. 1. Subsequently hot wire W moves upwardly to assume a position above foam web 11, i.e. its position as illustrated in FIG. 1.

Figure 3:
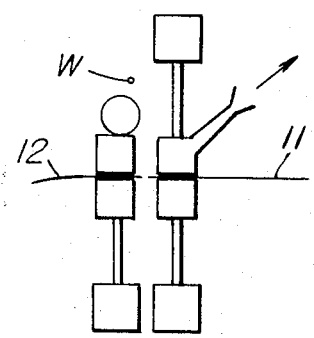

Subsequently, as illustrated in FIG. 3, the heated severed edge of foam web 11, held in position by vacuum clamping bar 15, is lowered into the same horizontal plane as the severed, heated edge of foam web 12, by pneumatically actuated cyclinder 16. Heated edge 11 is maintained in this plane by the nipping engagment thereof between vacuum clamping bar 15 and clamping bar 14 which is extended upwardly by pneumatic cyclinder 13.

Figure 4:
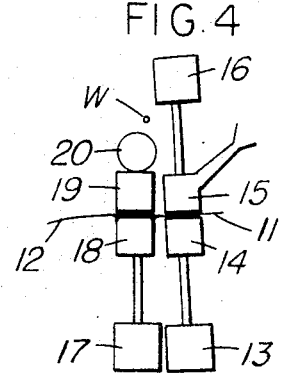

Subsequently, as illustrated in FIG. 4, the heated edges of the respective foam webs, i.e. the trailing edge of foam web 12 and the leading edge of foam web 11 are brought into pressure contact by pivotal movement of cyclinders 13 and 17 inwardly thereby effecting a heat weld transversely across the heated adjacent surfaces of webs 11 and 12.

Figure 5:
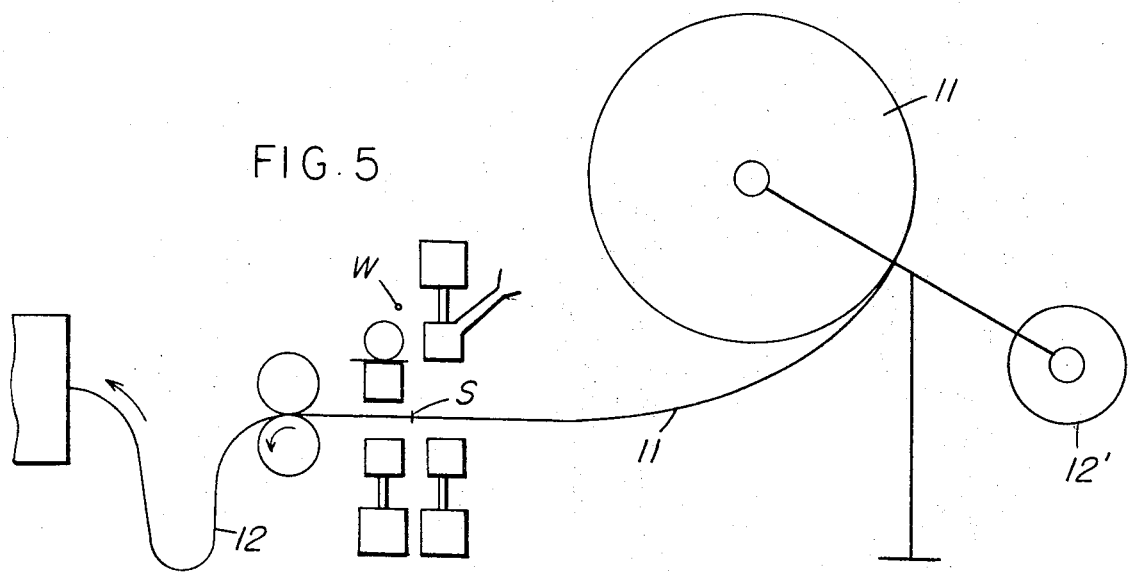

Finally, as illustrated in FIG. 5, cyclinders 13, 17 and 16 retract clamping members 14, 15 and 17 to their original positions as illustrated in FIG. 1 to permit continuous, noninterrupted advancement of web 12, now butt-welded or spliced S into the thermoformer preheat oven 22, fragmentarily represented schematically in FIGS. 5 and 1.

Although the present invention has been described with preferred embodiments, it is to be understood that modifications and variations may be resorted to, without departing from the spirit and scope of this invention, as those skilled in the art will appreciate. Such variations and modifications are therefore considered to be within the purview and scope of the appended claims.

What is claimed is:

1. A method for thermally splicing together the ends of thermoplastic foam sheet stock comprising, sequentially, (a) transversely severing, with a hot element a portion of the leading edge of a first foam sheet; (b) transversely severing, by continued movement of said hot element, a portion of the trailing edge of a second foam sheet; (c) moving said hot element out of contact with said severed edges and subsequently; (d) bringing said heated severed edges into abutting edge to edge relationship to thermally weld the preheated severed edge of said first sheet to the preheated severed edge of said second sheet.

2. An apparatus for thermally splicing together the ends of thermoplastic foam sheet stock which comprises (a) means for positioning the leading edge of a first foam sheet in a horizontal plane directly above the trailing edge of a second foam sheet; (b) heated means for transversely severing a portion of the leading edge of said first sheet, said heated means subsequently transversely severing a portion of the trailing edge of said second sheet; (c) means for moving the heated edges of said sheets into horizontal alignment and; (d) means for moving the heated edges of said sheets into abutting relationship to thermally weld said sheet edges together.

3. An apparatus in accordance with claim 2 which includes means for preheating the severed edges of said first and second sheets prior to moving said edges into abutting relationship.

* * * * *